United States Patent [19]

Bertschi

[11] Patent Number: 4,986,944
[45] Date of Patent: Jan. 22, 1991

[54] ANTI-COLLISION METHOD AND APPARATUS FOR AN INJECTION MOLD

[75] Inventor: Rene Bertschi, Toronto, Canada

[73] Assignee: Husky Injection Molding Systems Ltd., Bolten, Canada

[21] Appl. No.: 264,840

[22] Filed: Oct. 31, 1988

[51] Int. Cl.$^5$ .................. B29C 45/64; B29C 45/80
[52] U.S. Cl. .................. 264/40.5; 264/328.1; 425/138; 425/214; 425/577; 425/589
[58] Field of Search ............... 249/144, 148, 175, 161; 264/40.1, 40.5, 328.1, 328.11; 425/135–138, 150, 168, 542, 577, 589, 214; 100/256, 99, 46

[56] References Cited

U.S. PATENT DOCUMENTS

| | | | |
|---|---|---|---|
| 3,078,515 | 2/1963 | Wintriss | 425/138 |
| 3,647,337 | 3/1972 | Dega | 425/589 |
| 4,083,903 | 4/1978 | Gilbert et al. | 264/40.5 |
| 4,556,377 | 12/1985 | Brown | 425/138 |
| 4,775,130 | 10/1988 | Von Holdt | 425/168 |

FOREIGN PATENT DOCUMENTS 1416680 12/1975 United Kingdom ............... 249/144

Primary Examiner—Jill L. Heitbrink
Attorney, Agent, or Firm—Bachman & LaPointe

[57] ABSTRACT

A method and apparatus for effecting an accurate, clsoe tolerance guidance between relative movable male and female mold elements operable at high speed to mold thin wall articles free of the risk of mold damage due to relatively small occurrences of mold misalignment.

11 Claims, 3 Drawing Sheets

U.S. Patent    Jan. 22, 1991    Sheet 3 of 3    4,986,944 in the '377 device for

ANTI-COLLISION METHOD AND APPARATUS FOR AN INJECTION MOLD

FIELD OF THE INVENTION

The present invention relates to injection molding machines and relates, in particular, to such machines having, relatively movable, close tolerance, mold core and cavity assemblies for molding thin wall articles or containers at high molding speeds.

BACKGROUND OF THE INVENTION

The relative motion of such molds (fixed cavity and movable core, fixed core and movable cavity or movable core and movable cavity) occurs along an axis common to both the core and the cavity.

Since, the wall thickness of the articles molded and thus the clearance between core and cavity, in the molding position, ranges from 0.010 to 0.020 inches, it is necessary to maintain accurate alignment of the core and cavity along the common axis to avoid mold damage caused by improper contact between core and cavity during the molding cycle.

A prior art device, over which the present invention is an improvement, is disclosed and described in U.S. Pat. No. 4,556,377, entitled Self-Centering Arrangement for Coacting Forming Tools, issued Dec. 3, 1985 to Paul P. Brown.

The '377 patent discloses an externally tapered mold cavity 15 cooperating with a ring 25 surrounding core 20 having a mating taper as at A to guide the core into the cavity to maintain alignment.

The '377 patent is incorporated into the file of this application.

While the device of the '377 patent is operative, it has not proved satisfactory in situations where the product wall thickness is of the order of 0.010 to 0.020 inches.

In addition, there is no means in the '377 device for effecting a positive "stop" when damaging contact between the core and the mold is imminent.

SUMMARY OF THE INVENTION

Consequently, it is a primary feature of the present invention to provide an improved mold structure, which will prevent mold damage occurring from misalignment of the mold core and mold cavity.

It is a further feature of the invention to provide a method and an apparatus for blocking relative motion between a mold core and a mold cavity when physical interference is imminent.

A further feature of the invention is the provision of a protective structure and a safe process, which are especially useful in core and cavity assemblies designed to mold thin wall articles.

A further feature of the invention is the provision of cooperating configurations or surfaces on the core and cavity bodies, which are structured and designed to respond to misalignment of the mold core and mold cavity before the core and cavity makes undesirable and destructive contact during a high speed molding cycle.

A further feature of the invention is the provision of stepped or shouldered telescoping structure on the exterior of a mold core and a mold cavity having a sliding fit with a clearance, in assembly, which is less than the thickness of the wall of a molded article.

For example, the wall thickness of a thin wall article may be of the order of 0.010 to 0.020 inches, while the clearance between the telescoping steps, shoulders or lips may be of the order of 0.004 inches with a tolerance of plus or minus 0.002 inches.

Therefore, the present invention contemplates configuring the geometry of secondary surfaces of the mold core and mold cavity bodies so that blocking interference occurs on the secondary surfaces of the mold before damaging interference can occur on the interior or primary surfaces of the mold during the course of a high speed molding cycle.

The language "primary surface" is intended to denote a mold surface on the mold core or mold cavity used to shape an article and the language "secondary surface" is intended to denote surfaces on the bodies of the mold core and cavity other than primary surfaces.

It is usual and customary that mold core and mold cavity assemblies designed to mold thin wall articles have at least a coarse guidance or alignment means operative during the molding cycle in which the coarse guidance structure insures initial entry of the core into the cavity (or the cavity over the core) without interference or improper contact.

The present invention provides a fine, more accurate guidance or alignment means operative to preclude damage and to stop relative motion between the mold core and mold cavity if mold damage becomes imminent after initial entry.

The present invention is also directed to an improved method for effecting fine guidance.

A method for accomplishing accurate guidance and for precluding mold damage in a mold core and mold cavity assembly reciprocating through a definite stroke for molding thin wall articles embracing principles of the present invention may comprise creating a telescoping fit between a secondary surface of the mold cavity with a secondary surface of the mold core, dimensioning the clearance between said secondary surfaces to a value which is less than the wall thickness of said article and shaping the telescoping secondary surfaces to establish a region of potential interference during the course of said stroke whereby misalignment of the core and cavity triggers said interference to block further relative motion between said core and cavity thereby precluding mold damage.

A mold apparatus for insuring fine or accurate guidance and for precluding mold damage may comprise a mold core, a mating mold cavity, said core and cavity being movable relatively through a definite stroke to mold thin wall articles, stepped guide means encircling the mold core, a secondary surface of the mold cavity being formed with a stepped guide surface for receiving and nesting said guide means in reciprocatory fashion, the clearance between the guide means and said guide surface being less, substantially, than the thickness of said thin wall whereby the occurrence of said nesting insures that the core and cavity are in proper alignment preventing interference, scoring and mutilation of the mold during the course of high speed molding operations.

Other features and advantages of the present invention will become more apparent from an examination of the succeeding specification when read in conjunction with the appended drawings, in which:

DETAILED DESCRIPTION

Figure 1:
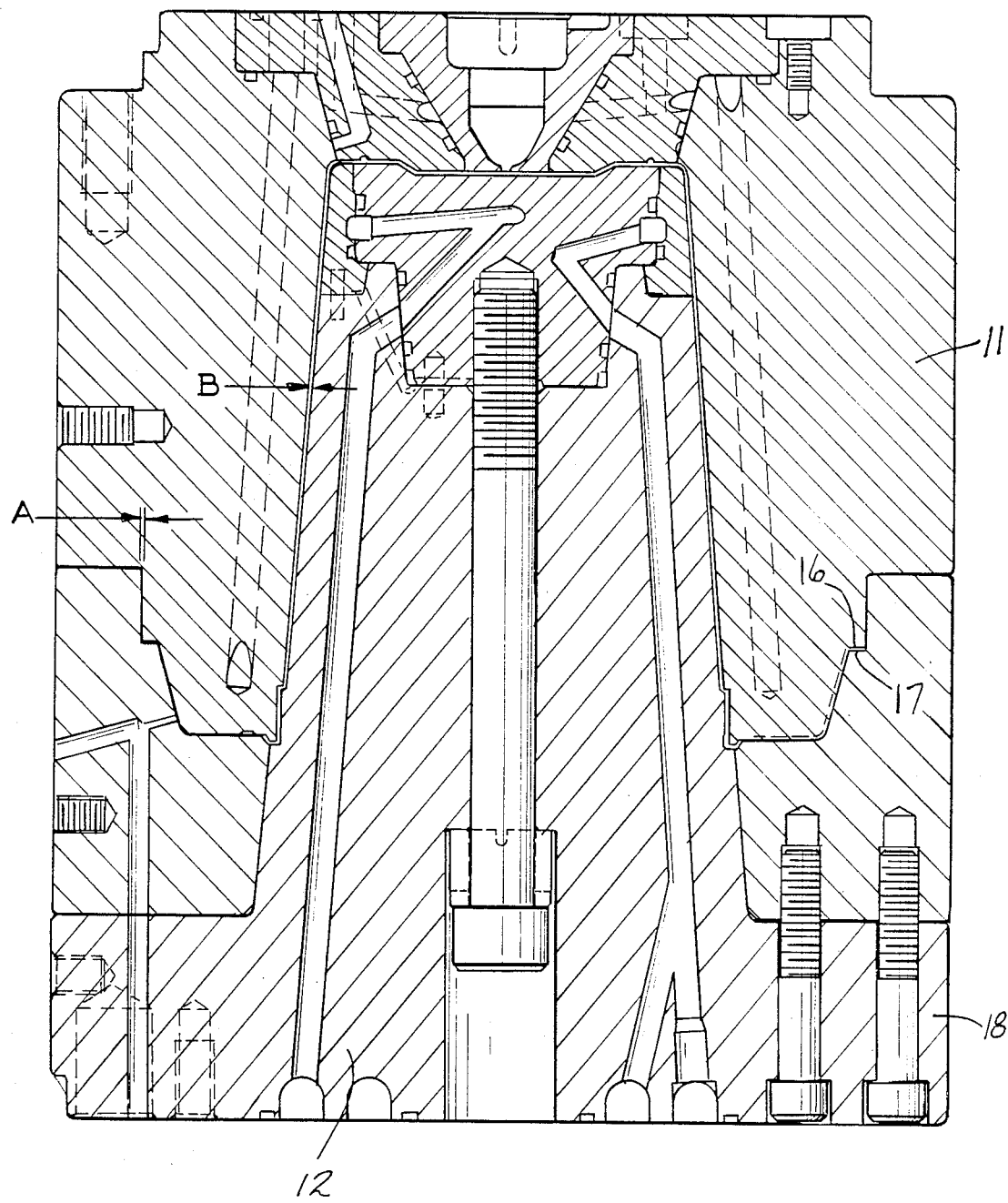
FIG. 1 is a cross-section view of the essential portions of an injection mold embracing the invention in the molding position.
Figure 2:
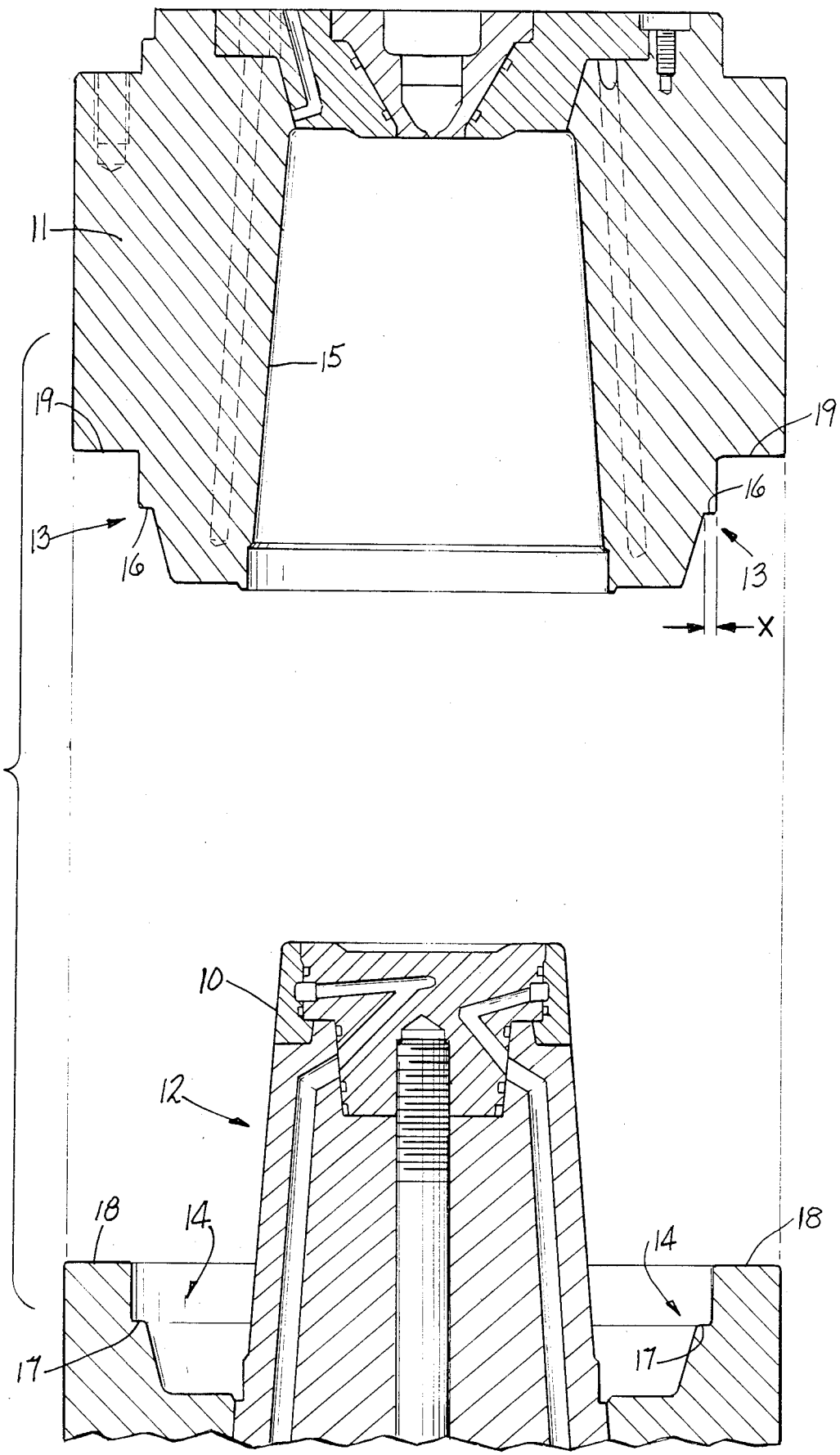
FIG. 2 is a view similar to FIG. 1 showing the mold in the article ejection position.

Referring to FIGS. 1–4, the reference numeral 11 designates a mold cavity and the reference numeral 12 designates a mold core movable from an article molding position, as shown in FIG. 1, to an article ejection position, as shown in FIG. 2, in usual and customary reciprocatory fashion along a definite stroke.

The mold core has a primary surface 10 and the mold cavity has a primary surface 15.

Independently of the cooperation between the primary surfaces 10 and 15 of the mold core and cavity, which define the shape of a molded article, the core and the cavity are provide with telescoping or nesting secondary surfaces indicated generally by the reference numeral 13 on the mold cavity and by the reference numeral 14 on the mold core.

For purposes of claiming the invention, the secondary surface 13 defines a guide surface and the secondary surface 14 defines a guide means.

The language "thin wall" is intended to denote thicknesses ranging from 0.010 to 0.020 inches. (See Dimension B in FIG. 1.) In contrast, clearance between surfaces 13 and 14 in the molding position of FIG. 1 are of the order of 0.004 with the tolerance of plus or minus 0.002 inches as indicated by the letter A in FIG. 1.

As stated previously, the present invention provides a positive method and an apparatus for practicing the method for precluding mold damage in high speed molding operations where the articles molded are of thin wall structure, particularly within the range of wall thicknesses recited above.

While many prior art core and cavity assemblies have what can be termed coarse core/cavity aligning means, there has been a need for a refined fine guidance or alignment means and method operable during the course of entry of the core into the mold cavity (or motion of the cavity over the core, as the case may be) to preclude scoring or mutilation of the mold surfaces during this critical portion of the stroke of the mold cycle.

Consequently, as is most apparent in FIG. 2, the secondary surfaces 13 and, 14 having a clearance which is less than the thickness of the wall of the molded article as identified by the letter A in FIG. 1, are formed with steps, shoulders or lips 16 and 17 which, when proper alignment occurs, nest, as shown in FIG. 1.

Figure 3:
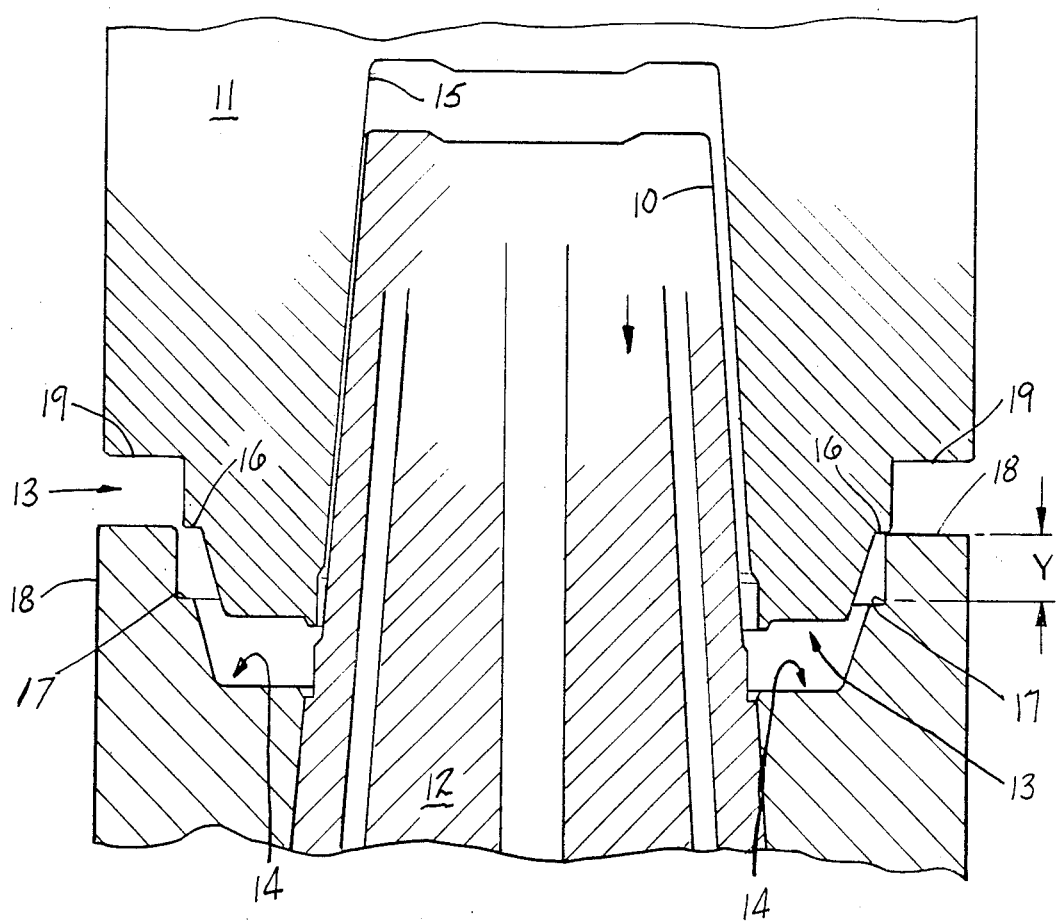
FIG. 3 shows the mold assembly blocked due to misalignment of the mold core and mold cavity elements.

However, should misalignment or cocking occur (frequently the result of improper article ejection) as the mold halves move together to the point where mold damage is imminent (contact between primary surfaces 10 and 15) step 16 on secondary surface contacts guide means 18 on secondary surface 14 to block further consolidation of the mold halves as is most apparent in FIG. 3.

Thus, even though the coarse alignment means (not shown) insures reasonable alignment between the mold cavity and the mold core, frequently there is sufficient residual misalignment which is detected by the fine guidance means and method of this invention to block further progression of the molding cycle thereby preventing serious mold damage.

It is to be understood that the guide means 18 (and its mating recess 19) can be extended or adjusted in height Y (FIG. 3) to change the point of interference with the step, lip or shoulder 16, the clearance between the secondary surfaces 13 and 14 (dimension, A of Figure 1) and offset (dimension X of FIG. 2) of the shoulder 16 may be changed individually or in combination (according to various permutations) to change the point or location of blocking as considerations of mold design, article wall thickness, mold stroke and mold cycle speed dictate.

Furthermore, it is within the principles of the present invention that the guide means 18 and the shoulder 16 be reversed, i.e. form the guide means 18 on the cavity body 11 and the shoulder 16 on the core body 12.

When interference or contact occurs at step 16 indicating misalignment, as shown in FIG. 3, one of a number of signals can be triggered to stop the molding cycle by well-known means.

Figure 4:
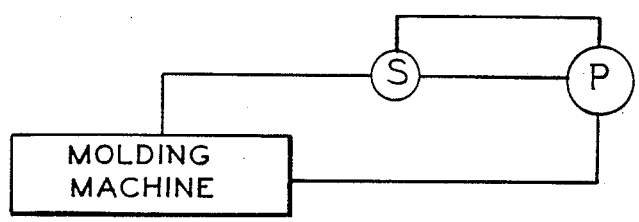
FIG. 4 is a schematic diagram of a unit for stopping the molding cycle when the occurrence illustrated in FIG. 3 occurs.

For example, as shown in FIG. 4, interference at step 16 in a hydraulically operated molding system would cause sudden increase in hydraulic pressure. An appropriate pressure sensor S in the hydraulic system would immediately activate a switch means to shut down the cycle by stopping pump P.

It is apparent that there has been provided in accordance with this invention an anti-collision device for an injection mold which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of preventing mold damage due to improper core and cavity alignment in an injection mold assembly for molding thin wall articles including a mold core and a concentric mold cavity moving relative to one another along a common axis in cyclic, reciprocatory fashion, said mold core and said mold cavity each having a primary surface for molding and a secondary surface for mold control wherein the clearance between the secondary surfaces is less than the thickness of the wall of an article molded by the assembly comprising the steps of:
   providing on one said secondary surfaces a shoulder concentric with said axis,
   providing on the other of said secondary surfaces a cooperating, concentric guide means,
   said shoulder and said guide means being operable to contact one another during said reciprocatory motion when the primary surfaces are improperly aligned to the extent that contact between said primary surfaces is imminent after initial entry of the mold core into the mold cavity, and
   utilizing the occurrence of contact between said secondary surfaces to signal shut down of the molding cycle whereby damage to the mold primary surfaces is averted.

2. The method of claim 1 in which the shut down signal is generated by a surge in power requirements due to blocking contact between said secondary surfaces.

3. In high speed injection molding of articles of thin wall construction utilizing a reciprocating, concentric mold core and mold cavity assembly having a definite stroke and a continuous cycle, a device for precluding damage to the mold core and mold cavity surfaces during the course of reciprocation along a common axis comprising:
  a mold core,
  a mating mold cavity, said core and cavity being movable, relatively,
  peripheral guide means formed on one of the mold core and the mold cavity disposed concentrically with said axis,
  a cooperating peripheral guide surface having a recess formed on the other of said mold core and said mold cavity for receiving and complementing said guide means in telescopic, concentric fashion,
  wherein said core and cavity mold surfaces are free of destructive contact when complementing one another during normal molding cycles,
  said guide surface contacting said guide means to block physically and positively the molding cycle when destructive contact between mold surfaces is imminent due to poor alignment after initial entry of the mold core into the mold cavity.

4. The device of claim 3 in which said guide surface is offset to define a shoulder calculated to interfere with said guide means to block motion between the mold core and the mold cavity when damage to the mold is imminent due to misalignment.

5. The device of claim 4 in which the guide means extends parallel to said axis and the length of said guide means determines the point along said axis at which interference occurs in the event of misalignment.

6. The device of claim 5 in which the length of said guide means and the clearance between the guide means and the guide surface determine, in combination, the point along said axis at which interference occurs in the event of misalignment.

7. The device of claim 4 including means for responsive to blocked motion for interrupting and stopping the molding cycle.

8. The device of claim 7 in which the means for interrupting and stopping the molding cycle is a pressure sensor.

9. The device of claim 3 in which the wall thickness ranges from 0.010 to 0.020 inches and the clearance between the guide means and the guide surface is 0.004 inches with a tolerance of plus or minus 0.002 inches.

10. The device of claim 3 in which the guide means encircles the core and forms a part of the core and the guide surface encircles the cavity and forms a part thereof.

11. A mold device comprising a mold core and cooperating mold cavity for molding thin wall articles, said mold core and mold cavity having primary and secondary surfaces, circular means incorporated in said secondary surfaces surrounding said primary surfaces for making blocking contact when said mold core and mold cavity are misaligned to the extent that damage to primary surfaces is imminent after initial entry of the mold core into the mold cavity.

* * * * *